United States Patent [19]

Martin

[11] 4,110,418

[45] Aug. 29, 1978

[54] COIL PACKING

[76] Inventor: Ted Martin, 927 Castlewood Ter., Chicago, Ill. 60640

[21] Appl. No.: 796,558

[22] Filed: May 13, 1977

[51] Int. Cl.² ............... B01D 53/20; B01D 47/14
[52] U.S. Cl. ................... 261/98; 261/DIG. 72; 267/180; 428/397
[58] Field of Search ................. 261/94–98, 261/DIG. 72; 267/179, 180; 428/371, 397

[56] References Cited

U.S. PATENT DOCUMENTS

| | | | |
|---|---|---|---|
| 1,307,635 | 6/1919 | Nielsen | 261/DIG. 72 |
| 1,327,422 | 1/1920 | Darier | 261/DIG. 72 |
| 1,494,989 | 5/1924 | Brégeat | 261/DIG. 72 |
| 1,857,764 | 5/1932 | Nygard | 267/180 |
| 2,332,110 | 10/1943 | Podbielniak | 261/DIG. 72 |
| 2,607,582 | 8/1952 | Jurgens | 267/180 |
| 3,171,774 | 3/1965 | Wheildon, Jr. et al. | 428/397 |
| 3,296,366 | 1/1967 | Bronikowski | 267/179 |
| 3,343,564 | 9/1967 | Peeples et al. | 267/180 |
| 3,391,910 | 7/1968 | Prahl | 261/DIG. 72 |
| 3,547,763 | 12/1970 | Hoffman, Jr. | 428/397 |
| 3,700,544 | 10/1972 | Matsui | 428/397 |
| 3,958,958 | 5/1976 | Klugman et al. | 261/DIG. 72 |

FOREIGN PATENT DOCUMENTS 104,163 10/1917 United Kingdom ............... 261/94

Primary Examiner—Frank W. Lutter
Assistant Examiner—Gregory N. Clements
Attorney, Agent, or Firm—Dressler, Goldsmith, Clement, Gordon & Shore, Ltd.

[57] ABSTRACT

The packing of the present invention is a continuous coil which has at least three turns, and preferably about six turns. Each turn has at least three sides which preferably are generally curved and has a generally rounded vertex between each pair of adjacent sides. Each turn of the packing is rotatably offset at least about 15°, and preferably between about 15° and 20°, relative to each adjacent turn of the packing. The coil packing preferably is generally cylindrical in cross-section, and defines a generally cylindrical passage which extends axially through the coil packing. The coil packing is suitable for use in columns or towers for absorption, adsorption or rectification.

7 Claims, 7 Drawing Figures

COIL PACKING

BACKGROUND OF THE INVENTION

The present invention relates to packings for use in towers or columns for bringing about intimate contact between two immiscible or partially miscible fluids, either a gas and a liquid, or two liquids.

Packed columns or towers are used in diffusional operations which include absorption, stripping, scrubbing, distillation and extraction. Essentially, the packed column is a vertical shell which is placed upon a foundation and is filled with packing materials which are supported on a screen of an open pattern which does not offer a high resistance to flow. The columns may vary in diameter from about 1 inch for small laboratory purposes to 15 feet for large industrial operations. Industrial columns may be up to about 100 feet in height. The pressure of the column ranges from high vacuum to a high pressure, depending on both the chemical and physical properties of the system.

There are three main classes of packings — broken solids, grids and shaped packings.

The broken solids are the least expensive form and are typically irregularly shaped bodies of stone, rock, tile or coke. Although they frequently are a good corrosion-resistant material, they are not as satisfactory as shaped packings either in regard to liquid flow or in regard to offering an effective surface for transfer. With broken solids, it is also difficult to form a packing of uniform sizes to produce a bed of uniform characteristics with a desired voidage.

Grid packings are relatively easy to fabricate and are usually used in columns of squared section. They may be made from wood, plastics, carbon, or ceramics. The main problem with grid packings is in obtaining good liquid distribution because, at high liquid rates, the liquid tends to cascade from one grid to the next without being broken up into fine droplets which are desirable for high interfacial surface.

Shaped packings include the commonly used Raschig rings, Pall rings, Lessing rings and Berl saddles. Most of these packings are available in ceramics, metals, glass, plastics, carbon, and sometimes rubber. The rings are extruded packings, and the saddles require punch dies for their manufacture. The main disadvantage of shaped packings is their relatively higher cost, particularly when small sizes are used.

SUMMARY OF THE INVENTION

The foregoing disadvantages of the prior art are overcome by the shaped packing of the present invention.

The packings in accordance with the present invention are each a continuous coil which has at least three turns, and preferably about six turns. Each turn has at least three sides which preferably are generally curved, and each pair of adjacent sides preferably have a generally rounded vertex therebetween. Each turn of the coil is rotatably offset at least about 15°, and preferably between about 15° and about 20°, relative to each adjacent turn of the coil. The coil is generally cylindrical in cross-section, and defines a generally cylindrical passage which extends axially therethrough.

The packings are suitable for use in columns or towers for absorption, stripping, scrubbing, distillation and extraction and have the desirable properties of high surface area per unit volume, high ratio of effective area to total area, high percentage of free space (voidage), irregularity in shape to prevent pattern-like packing, low side thrust on column or tower walls, favorable fluid distributing qualities, low apparent density and high unit strength, low cost, low pressure drop, and durability.

The packing of the present invention is to be known under the name "MARCOIL."

DESCRIPTION OF THE PREFERRED EMBODIMENT

Figure 1:
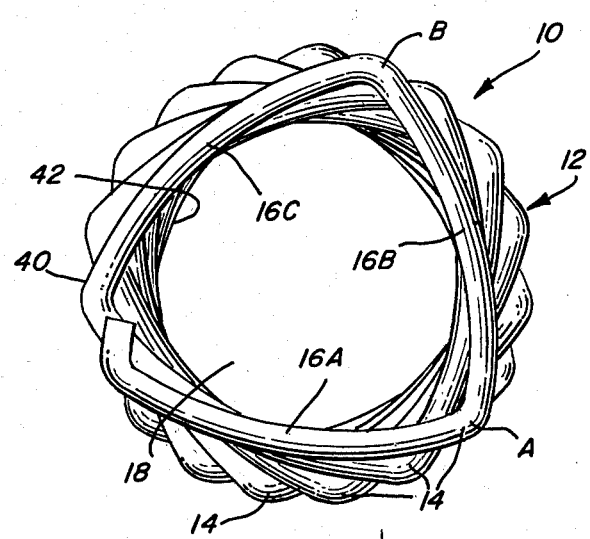
FIG. 1 is a plan view of the packing of the present invention.
Figure 2:
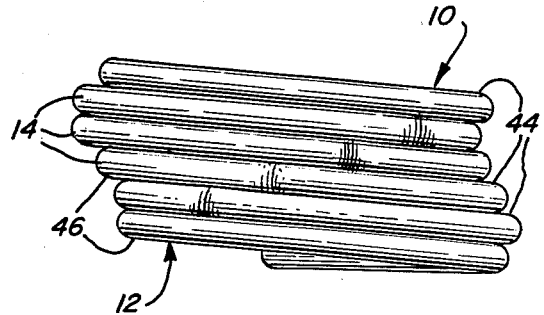
FIG. 2 is an elevated plan view of the packing shown in FIG. 1.

Referring to FIGS. 1 and 2 of the drawing, there is shown a packing 10 which is a continuous coil formed of a wire 12 which may be a metal such as iron, copper, aluminum, silver, gold, platinum, or various alloys. The wire may also be formed of plastic or other suitable materials.

To form the coil packing 10, wire 12 is wound into at least three turns 14, and preferably about six turns. Since the coil packing 10 is wound as shown in FIGS. 1 and 2, the beginning of each turn 14 is displaced relative to the end of the turn by about the thickness of the wire 12; however, each turn 14 can be thought of as being generaly planar.

As shown in FIG. 1, each turn 14 has at least three sides 16A, 16B and 16C. There are vertices between each pair of adjacent sides, and the vertices preferably are rounded, as shown by the rounded vertex A between sides 16A and 16B and by rounded vertex B between sides 16B and 16C. The sides preferably are arcuate between the vertices, as shown by the curved side 16B between vertices A and B.

As shown in plan view in FIG. 1, each turn 14 of the coil packing 10 is rotatably offset relative to each adjacent turn 14. Preferably, each turn 14 is offset at least 15° relative to each adjacent turn. Most preferably, each turn is offset between about 15° and about 20° relative to each adjacent turn.

The coil packing 10 defines an opening or passage 18 which extends axially through the coil packing. Although the passage 18 defined by the sides of each turn of the coil packing is generally triangular in shape, the passage 18 which is defined by the entire coil packing 10 is generally cylindrical (FIG. 1) due to the displacement of each turn 14 relative to each adjacent turn.

Figure 5:
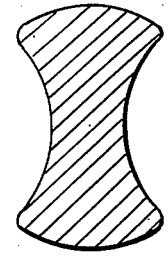
FIGS. 4-6 are cross-sectional views of portions of alternate embodiments of packings in accordance with the present invention.
Figure 6:
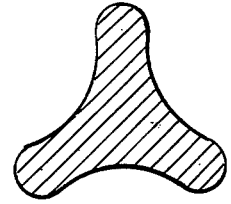
Figure 4:
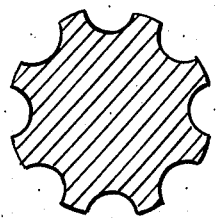
Figure 3:
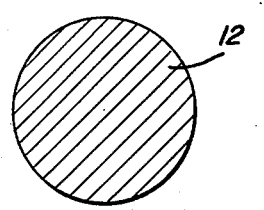
FIG. 3 is a cross-sectional view of a portion of the packing shown in FIGS. 1 and 2.

Although the wire 12 preferably is cylindrical in cross-section, as shown in FIG. 3, other configurations of the wire are also suitable for use with the present invention. For example, the rod may be fluted in cross-section as shown in FIG. 4, or may have the shapes which are shown in cross-section in FIGS. 5 and 6.

Figure 7:
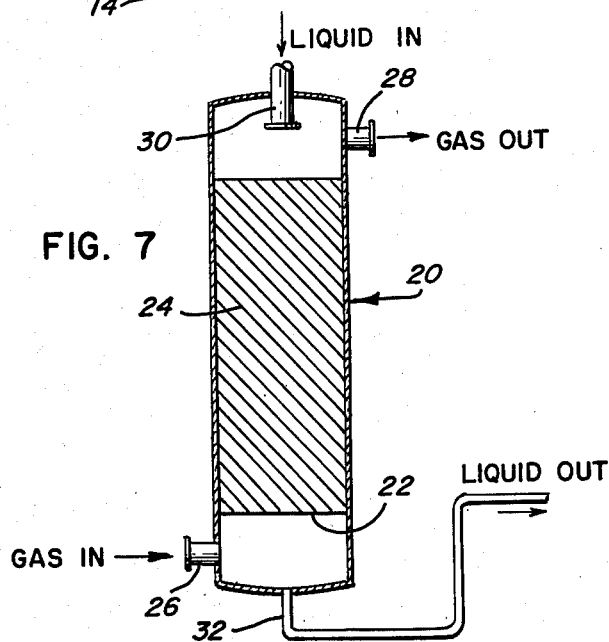
FIG. 7 is a schematic view of a column in which the packing of the present invention is used.

One use of the coil packings 10 of the present invention is in a column for bringing about intimate contact between two immiscible or partially miscible fluids — such as a gas and a liquid. An example of the liquid-gas system is an absorbent process shown schematically in FIG. 7 where a soluble gas is scrubbed from a mixture of gases by means of a liquid. In this example, column 20 supports a grid or screen 22, and a plurality of coil packings 10 are dumped into the column and occupy the cross-hatched area 24. Countercurrent flow is used with the gas entering at the bottom in inlet 26 and exiting through outlet 28 at the top, and the liquid entering at the top in inlet 30 and exiting through outlet 32 at the bottom.

To minimize cost, it is important to maximize the contact between the two fluids per unit volume of the column. It is therefore extremely important that the packing will promote a high interfacial area between the two fluids and a high degree of turbulence in the fluids.

The coil packings 10 of the present invention are superior to prior art packings in that they achieve these important requirements and have the following desirable properties: high surface area per unit volume, high ratio of effective area to total area, high percentage of free space (voidage), irregularity in shape to prevent pattern-like packing, low side thrust on column or tower walls, favorable fluid distributing qualities, low apparent density and high unit strength, low cost, low pressure drop, and durabilty.

High surface area is considered in connection with the area of availability. High area availability is obtained when the packings offer high voidage and when the individual packings are irregularly shaped as in the present invention. The coil packings 10 clearly are irregular in shape and thereby prevent pattern-like packing. The irregularity in shape also results in the favorable characteristic of a more uniform fluid distribution since the fluid distribution is less apt to be different at various sections of the column or tower in beds of packings having random arrangements of packings. In addition, the packings of the present invention have a high fraction of free space and a low apparent density. They are also high in strength, relatively low in cost, and durable.

The coil packings 10 of the present invention maximize the area of availability because fluid can contact each coil packing 10 along the outside surface 40 thereof or along the inside surface 42 thereof (FIG. 1). In addition, since each turn 14 is offset relative to each adjacent turn, most of the surface area along the top 44 and bottom 46 of each turn 14 is also available for contact with fluid (FIG. 2).

The configuration of coil packings 10, and particularly the passage 18, have additional features. The essentially unobstructed passage 18 is effective in channeling the fluid flowing therethrough. In addition, the offset relationship between adjacent turns of the coil packing results in a generally spiral configuration, which has the advantage of increasing the turbulence of the fluid stream which improves the mass transfer characteristics of the column. Likewise, the outside surface 40 of the coil packing 10 has a generally spiral configuration with the vertices (such as A and B) exposed, thereby further increasing the turbulence and the performance of the column. The irregular outside surface 40 also has the advantage of preventing undesirable pattern-like arrangements of the coil packings.

As can be seen from the foregoing, the coil packings 10 of the present invention maximize surface area availability and are of a most efficient construction and configuration. The coil packings 10 are adapted for filling absorption, adsorption and rectification columns or towers. The diameter and cross-sectional shape of the wire, as well as the specific material of the wire, can be especially selected for the specific process in which the coil packings are used. The coil packings may also simultaneously serve as catalysts in the column or tower. The diameter of the cylindrical passage 18 and the number of turns 14 which determine the overall length of the coil packing 10 may be individually selected to satisfy the requirements of the specific process in which the coil packings are used.

From the foregoing, it will be observed that numerous variations and modifications may be effected without departing from the true spirit and scope of the novel concept of the invention. It is, of course, intended to cover by the appended claims all such modifications as fall within the scope of the claims.

I claim:

1. The combination of a tower for bringing about contact between a liquid and a gas, said tower having a first inlet and a first outlet for said liquid and a second inlet and a second outlet for said gas, and a packing comprising a continuous coil having at least three turns, each of said turns having at least three sides, each turn of said packing being rotatably offset relative to each adjacent turn, and said coil defining an opening between the sides of each turn.

2. The combination as defined in claim 1 wherein each turn is offset at least 15° relative to each adjacent turn.

3. The combination as defined in claim 1 wherein each turn is offset between about 15° and about 20° relative to each adjacent turn.

4. The combination as defined in claim 1 wherein said coil is generally cylindrical in cross-section.

5. The combination as defined in claim 1 wherein each of said sides in said turns are curved.

6. The combination as defined in claim 5 wherein there are vertices between each pair of adjacent sides, and said vertices are rounded.

7. The combination of a tower for bringing about contact between a liquid and a gas, said tower having a first inlet and a first outlet for said liquid and a second inlet and a second outlet for said gas, and a tower packing comprising a continuous coil having at least three turns, each of said turns having three sides which are generally curved, each pair of adjacent sides having a generally rounded vertex therebetween, each turn of said coil being rotatably offset between about 15° and about 20° relative to each adjacent turn of said coil, said coil being generally cylindrical in cross-section, and said coil defining an opening between the sides of each turn.

* * * * *